T. S. CHESNUTT.
WHEEL.
APPLICATION FILED DEC. 29, 1910.

1,005,103.

Patented Oct. 3, 1911.

2 SHEETS—SHEET 1.

Witnesses
W. C. Fielding
Henry T. Bright

Inventor
Thomas S. Chesnutt.
By
Attorneys

T. S. CHESNUTT.
WHEEL.
APPLICATION FILED DEC. 29, 1910.
1,005,103.
Patented Oct. 3, 1911.
2 SHEETS—SHEET 2.
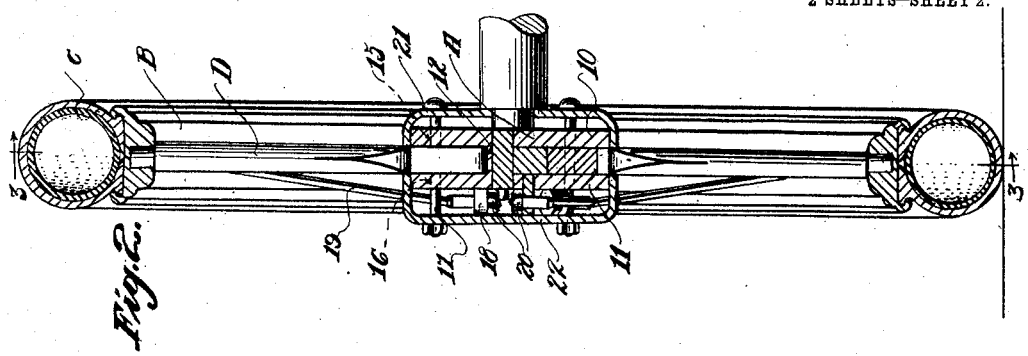
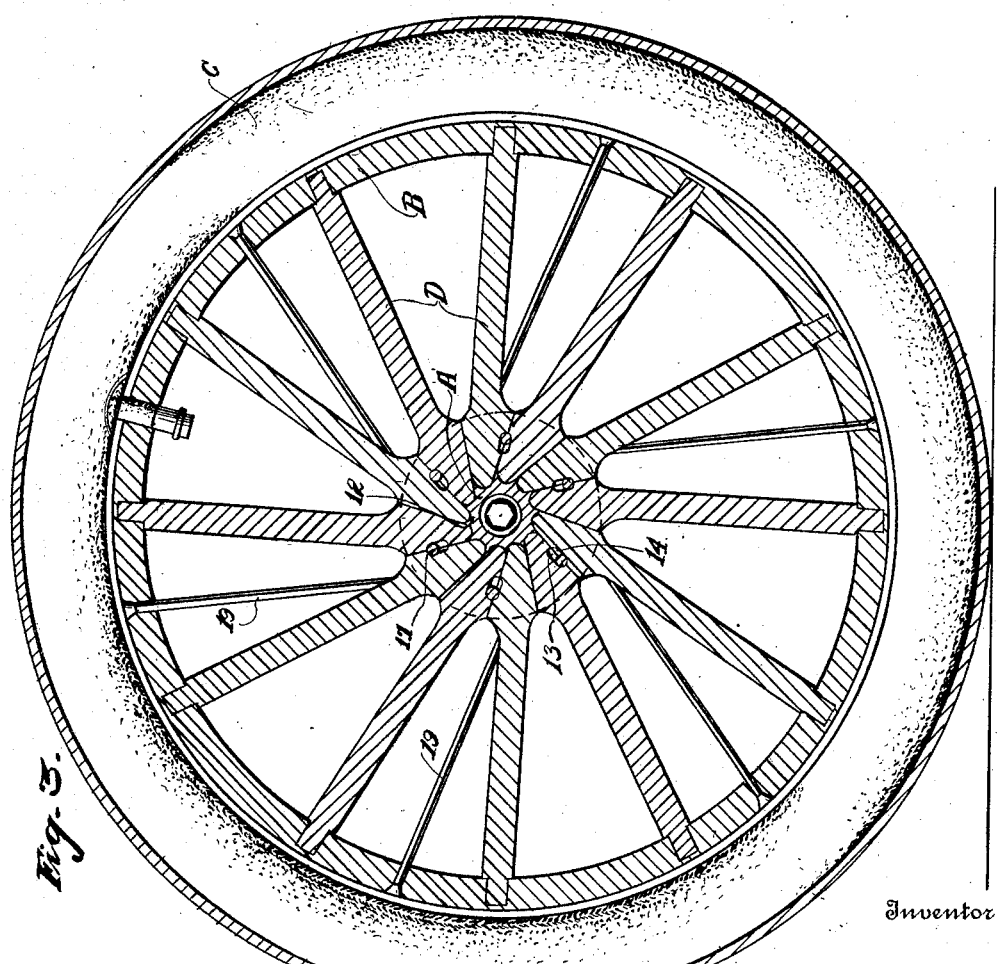
Witnesses
Inventor
Thomas S. Chesnutt

UNITED STATES PATENT OFFICE.

THOMAS S. CHESNUTT, OF BUFFALO, NEW YORK.

WHEEL.

1,005,103.        Specification of Letters Patent.        Patented Oct. 3, 1911.

Application filed December 29, 1910. Serial No. 599,855.

*To all whom it may concern:*

Be it known that I, THOMAS S. CHESNUTT, a citizen of the United States, residing at Buffalo, in the county of Erie, State of New York, have invented certain new and useful Improvements in Wheels; and I do hereby declare the following to be a full, clear, and exact description of the invention, such as will enable others skilled in the art to which it appertains to make and use the same.

This invention relates to wheels, and particularly that type adapted to be associated with the drive axle of an automobile.

The object of the invention resides in the provision of a wheel of the character named in which the load sustaining spokes are so arranged as to receive and transmit the thrust of the hub in a direction longitudinally of said spokes and thereby enhance the general strength, durability and sustaining qualities of the wheel.

A further object of the invention resides in the provision of a wheel of the character named in which the felly and the hub are connected by means of draw rods which may be actuated to move the felly toward the hub and thereby effect a tightening of the load sustaining spokes.

With these and other objects in view, the invention consists in the details of construction and in the arrangement and combination of parts to be hereinafter more fully described and particularly pointed out in the appended claims.

Figure 1:
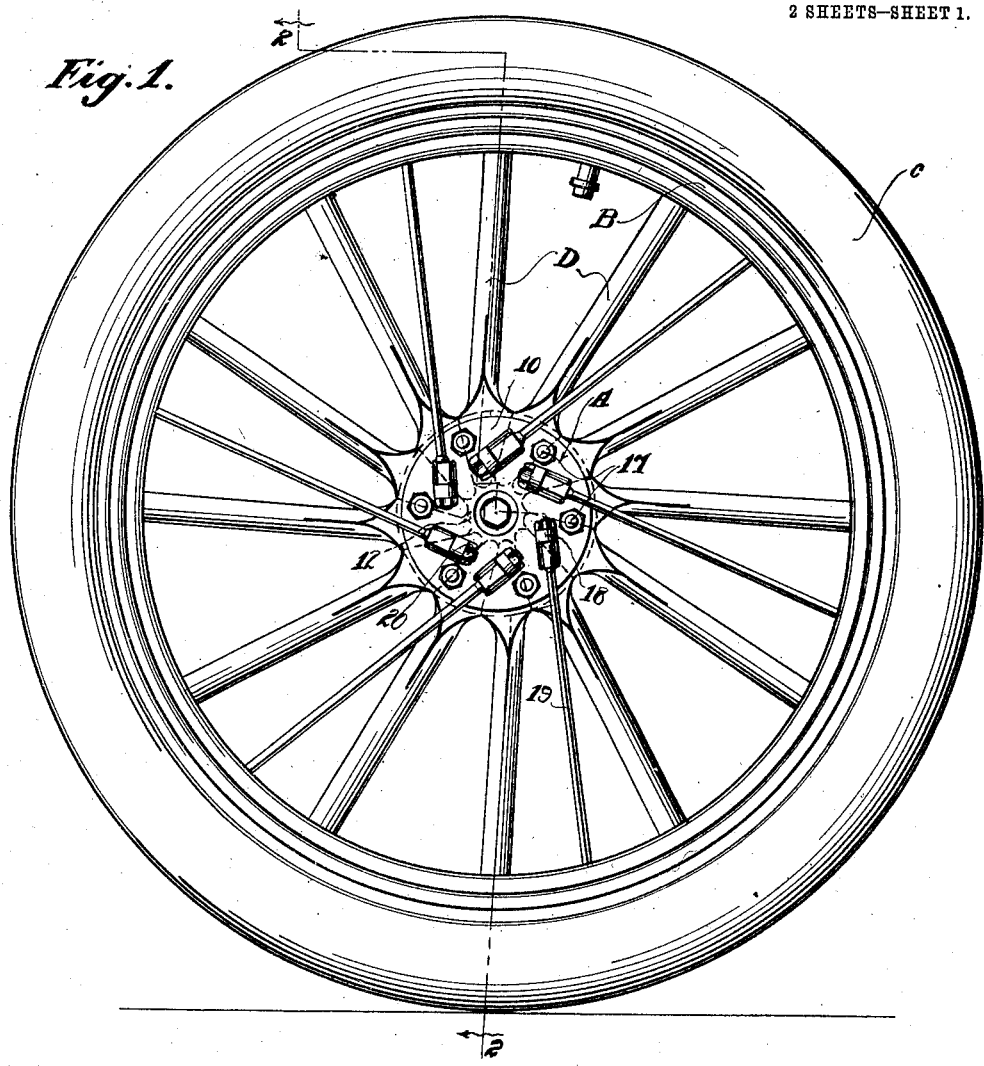
Figure 4:
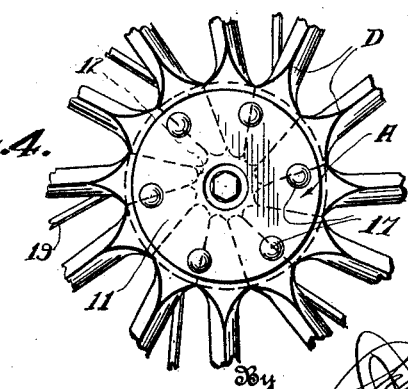

In describing the invention in detail, reference will be had to the accompanying drawings, wherein like characters of reference denote corresponding parts in the several views; and in which, Figure 1 is a side elevation of a wheel constructed in accordance with the invention, with the near dust shield removed; Fig. 2, a section on the line 2—2 of Fig. 1, with the dust shield removed in Fig. 1 shown in place; Fig. 3, a section on the line 3—3 of Fig. 2; and, Fig. 4, a detail view of the hub, looking at the end opposite to that shown in Fig. 1.

Referring to the drawings, the wheel is shown as comprising a hub A, felly B, tire C and load sustaining spokes D connecting the hub and felly. The hub A has its terminals provided with annular flanges 10 and 11 respectively, and the intermediate portion of said hub which lies between the flanges 10 and 11 is provided with a plurality of successive tangentially directed recesses 12, in which is adapted to be disposed the inner ends of the spokes D respectively. The recesses 12 are each concave in cross section, and the inner ends of the spokes D are correspondingly convex so as to fit snugly in said recesses with their side faces in engagement with the flanges 10 and 11 and their adjacent faces in contact with each other at their inner ends. When the inner ends of the spokes are thus seated in the recesses 12, the spokes themselves will of course lie substantially tangential of the hub A so that when the hub is rotated by the drive axle of the automobile, the thrust thereof will be received and transmitted by the spokes in a direction longitudinally of the latter. This means of receiving and transmitting the thrust of the hub will greatly enhance the general strength and durability of the wheel.

Each alternate pair of adjacent engaging faces of the inner ends of the spokes D are provided respectively with mating recesses 13 and 14 which form an elongated bolt receiving opening, and this opening is alined with openings 15 and 16 in the flanges 10 and 11. Passing through each of the elongated openings formed by the mating recesses 13 and 14 and the openings 15 and 16 alined therewith is a bolt 17 which serves to secure the spokes D against detachment from the hub A, the openings formed by the mating recesses 13 and 14 however are of such size as to permit a limited independent movement of adjacent spokes and thereby allow the proper truing of the wheel in a manner to be hereinafter referred to.

Mounted on one end of the hub A is a plurality of eyes 18 the number of which is equal to one-half the number of spokes D. Extending through each of these eyes is the threaded inner end of a draw spoke 19 which has its outer end secured to the felly B in a suitable manner. These draw spokes 19 are secured to the felly B in succession between each alternate pair of load sustaining spokes D.

Mounted on the threaded inner ends of the draw spokes 19 are nuts 20, through the manipulation of which the felly B may be drawn toward the hub A to effect the tightening of the load sustaining spokes D.

The ends of the hub A are covered respectively by dust shields 21 and 22 which are adapted to be secured in place by certain of the bolts 17, which have their threaded ends extended through the respective dust shields and provided with binding nuts.

From the foregoing, it will be apparent there has been provided a very simple wheel in which the necessity of having the thrust of the hub transmitted laterally by the spokes is entirely obviated and an efficient means thereby provided of preventing the driving strain from twisting the wheel out of shape and rendering the same useless.

What is claimed is:

1. A wheel comprising a hub, a rim, a plurality of thrust receiving and transmitting load sustaining spokes arranged tangentially of the hub and connecting same with the rim, and a plurality of draw spokes connecting the rim and hub, whereby the former may be drawn toward the latter and the load sustaining spokes tightened.

2. A wheel comprising a hub, a rim, a plurality of thrust receiving and transmitting load sustaining spokes arranged tangentially of the hub and connecting same with the rim, and a plurality of draw spokes having their outer ends connected to the rim, and provided with threaded inner ends, eyes mounted on one end of the hub for receiving the threaded inner ends of the draw spokes respectively, and nuts mounted on the threaded ends of each draw spoke, whereby the rim may be adjusted toward the hub to tighten the load sustaining spokes.

In testimony whereof, I affix my signature, in presence of two witnesses.

THOMAS S. CHESNUTT.

Witnesses:
CLIFFORD NICHOLS,
ANNA G. WEIFFENBACH.